United States Patent
Menon et al.

(10) Patent No.: US 10,252,337 B2
(45) Date of Patent: Apr. 9, 2019

(54) METHODS FOR DIRECTIONALLY RECRYSTALLIZING ADDITIVELY-MANUFACTURED METALLIC ARTICLES BY HEAT TREATMENT WITH A GRADIENT FURNACE

(71) Applicant: HONEYWELL INTERNATIONAL INC., Morris Plains, NJ (US)

(72) Inventors: Mamballykalathil Menon, Gilbert, AZ (US); Brian G. Baughman, Surprise, AZ (US); James J. Cobb, Casa Grande, AZ (US); Donald G. Godfrey, Phoenix, AZ (US); Mark C. Morris, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 394 days.

(21) Appl. No.: 15/250,057

(22) Filed: Aug. 29, 2016

(65) Prior Publication Data
US 2018/0056396 A1  Mar. 1, 2018

(51) Int. Cl.
| | |
|---|---|
| *B22F 3/24* | (2006.01) |
| *B33Y 10/00* | (2015.01) |
| *B33Y 40/00* | (2015.01) |
| *B33Y 80/00* | (2015.01) |
| *B22F 3/105* | (2006.01) |
| *B22F 3/15* | (2006.01) |
| *B22F 5/00* | (2006.01) |
| *B22F 5/04* | (2006.01) |
| *B23K 15/00* | (2006.01) |
| *C22F 1/10* | (2006.01) |
| *F01D 5/12* | (2006.01) |
| *F01D 5/14* | (2006.01) |
| *B23K 101/00* | (2006.01) |
| *B23K 103/08* | (2006.01) |

(52) U.S. Cl.
CPC .............. *B22F 3/24* (2013.01); *B22F 3/1055* (2013.01); *B22F 3/15* (2013.01); *B22F 5/009* (2013.01); *B22F 5/04* (2013.01); *B23K 15/0086* (2013.01); *B33Y 10/00* (2014.12); *B33Y 40/00* (2014.12); *B33Y 80/00* (2014.12); *C22F 1/10* (2013.01); *F01D 5/12* (2013.01); *F01D 5/147* (2013.01); *B22F 2003/1058* (2013.01); *B22F 2003/247* (2013.01); *B22F 2003/248* (2013.01); *B22F 2301/15* (2013.01); *B22F 2998/10* (2013.01); *B23K 2101/001* (2018.08); *B23K 2103/08* (2018.08); *F05D 2230/22* (2013.01)

(58) Field of Classification Search
CPC .. B22F 3/24; B22F 3/1055; B22F 3/15; B22F 5/009; B22F 5/04; B33Y 10/00; B33Y 40/00; B33Y 80/00; B23K 15/0086; C22F 1/10; F01D 5/12
USPC .......................................................... 419/28
See application file for complete search history.

(56) References Cited

U.S. PATENT DOCUMENTS

| | | | |
|---|---|---|---|
| 3,975,219 | A | 8/1976 | Allen et al. |
| 4,226,644 | A | 10/1980 | Cox et al. |
| 4,318,753 | A | 3/1982 | Anderson, Jr. et al. |
| 7,892,370 | B2 | 2/2011 | Ott et al. |

FOREIGN PATENT DOCUMENTS

| | | |
|---|---|---|
| CA | 1136905 A | 12/1982 |
| WO | 2014052323 A1 | 4/2014 |

OTHER PUBLICATIONS

Extended EP Search Report for Application No. 17185425.0 dated Feb. 1, 2018.

*Primary Examiner* — Edward M Johnson
(74) *Attorney, Agent, or Firm* — Lorenz & Kopf, LLP

(57) ABSTRACT

A method for manufacturing a metallic article includes providing or obtaining a metallic material in powder form, using an additive manufacturing process, building the metallic article from the powder-form metallic material, layer-by-layer, in a build direction, wherein as a result of the additive manufacturing process, the metallic article comprises columnar grain structures oriented in the build direction, and conveying the metallic article through a gradient furnace in a direction of conveyance from a first area of the gradient furnace to a second area of the gradient furnace to increase a size of the columnar grain structures in the metallic article. The metallic article is conveyed through the gradient furnace in an orientation such that the columnar structures oriented in the build direction are substantially parallel to the direction of conveyance.

10 Claims, 5 Drawing Sheets

METHODS FOR DIRECTIONALLY RECRYSTALLIZING ADDITIVELY-MANUFACTURED METALLIC ARTICLES BY HEAT TREATMENT WITH A GRADIENT FURNACE

TECHNICAL FIELD

The present disclosure generally relates to metallic article manufacturing methods. More particularly, the present disclosure relates to the formation of a directionally recrystallized microstructure in additively-manufactured metallic articles using a gradient furnace.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary vanes. The combustion gas flow deflects off of the vanes and impinges upon turbine blades of a turbine rotor. A rotatable turbine disk or wheel, from which the turbine blades extend, spins at high speeds to produce power. Gas turbine engines used in aircraft use the power to draw more air into the engine and to pass high velocity combustion gas out of the gas turbine aft end to produce a forward thrust.

In the development and testing of new designs for gas turbine engine components, it is important to minimize the amount of time required to manufacture "critical path components," like cooled turbine blades and vanes. In high performance gas turbine engine applications, these cooled turbine blades and vanes are typically manufactured using superalloy materials and casting processes to produce a single crystal or polycrystalline material. For example, cast turbine blades and vanes can be made by means of directional solidification of a liquid melt pool that is in the shape of the article. The melted alloy in the shape of the article is then slowly solidified from one end by a process that extracts heat in the direction in which the fast growing grains are desired to be oriented in its preferred growth direction. The growth of these fast growing grains naturally occurs in the crystallographic direction with the miller indices of <001>.

However, for the above-noted purposes of development and testing, the casting process takes an undesirably long time and involves (i) making core dies, cores, wax dies, wax patterns, and ceramic molds with an inner cavity in the form of the article, (ii) a melt furnace of sufficient inner volume in which the alloy can be completely melted, (iii) a ceramic sieve to filter out unwanted ingredients in the melt pool, and (iv) a heated furnace with heat extraction capabilities. As such, it should be appreciated that the investment for this assembly of equipment is large, and the lead time to make the first article takes many months. This prior art casting process is too expensive and too time consuming for fast-paced and/or low volume development programs.

Hence, there is a need for manufacturing methods that allow for the production of metallic articles, such as gas turbine engine components, which exhibit properties that are the same as or similar to traditionally-cast directionally-solidified articles, yet which do not require the time and expense of traditional casting processes. Furthermore, other desirable features and characteristics of directionally recrystallized microstructure in additively-manufactured metallic articles, and the method for manufacturing the same will become apparent from the subsequent detailed description and the appended claims, taken in conjunction with the accompanying drawings and the preceding background.

BRIEF SUMMARY

Various methods for manufacturing metallic articles are disclosed herein. In one exemplary embodiment, a method for manufacturing a metallic article includes the steps of providing or obtaining a metallic material in powder form, using an additive manufacturing process, building the metallic article from the powder-form metallic material, layer-by-layer, in a build direction, wherein as a result of the additive manufacturing process, the metallic article comprises columnar grain structures oriented in the build direction, and conveying the metallic article through a gradient furnace in a direction of conveyance from a first area of the gradient furnace to a second area of the gradient furnace to increase the length of the columnar grain structure in the metallic article. The metallic article is conveyed through the gradient furnace in an orientation such that the columnar structures oriented in the build direction are substantially parallel to the direction of conveyance.

In another exemplary embodiment, A method for manufacturing a metallic article includes the steps of providing or obtaining a metallic material in powder form, using an additive manufacturing process, building the metallic article from the powder-form metallic material, layer-by-layer, in a build direction, wherein as a result of the additive manufacturing process, the metallic article comprises columnar grain structures oriented in the build direction, and building a sacrificial piece onto the metallic article using the additive manufacturing process, the sacrificial piece being metallurgically coupled to the metallic article and comprising the metallic material. The method further includes conveying the metallic article through a gradient furnace in a direction of conveyance from a first area of the gradient furnace to a second area of the gradient furnace to increase a size of the columnar grain structures in the metallic article. The metallic article is conveyed through the gradient furnace in an orientation such that the columnar structures oriented in the build direction are substantially parallel to the direction of conveyance. The first area of the gradient furnace heats the metallic article to a temperature that is below a solvus temperature of the metallic material and the second area of the gradient furnace heats the metallic article to a temperature that is above the solvus temperature of the metallic material, the temperature of the gradient furnace increasing in a gradated manner from the first area to the second area. Furthermore, the metallic article is oriented with respect to the gradient furnace such that the sacrificial piece enters the gradient furnace subsequent to the metallic article onto which the sacrificial piece is built.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The present disclosure provides methods for directionally-recrystallizing metallic articles, such as gas turbine engine blades and vanes, which are manufactured using additive manufacturing techniques, such as direct metal laser sintering or electron beam melting. Although the present disclosure is provided in the context of gas turbine engine development and testing, it should be appreciated that the methods described herein may be used for the manufacturing of any metallic article to be used for any application. The disclosed methods produced directionally-recrystallized metallic articles that exhibit metallic properties that are the same as or similar to traditionally-cast directionally-solidified articles. Beneficially, the disclosed methods allow for the rapid design and production of such components to reduce cycle time in the development and testing of critical path components. Moreover, design and testing of the articles improved due to the fact that the metallic articles manufactured in accordance with the present disclosure, due to their enhanced crystallographic orientation (as compared non-resolidified additively-manufactured articles), are able to be tested at higher operating temperatures and for longer periods of time.

Figure 1:
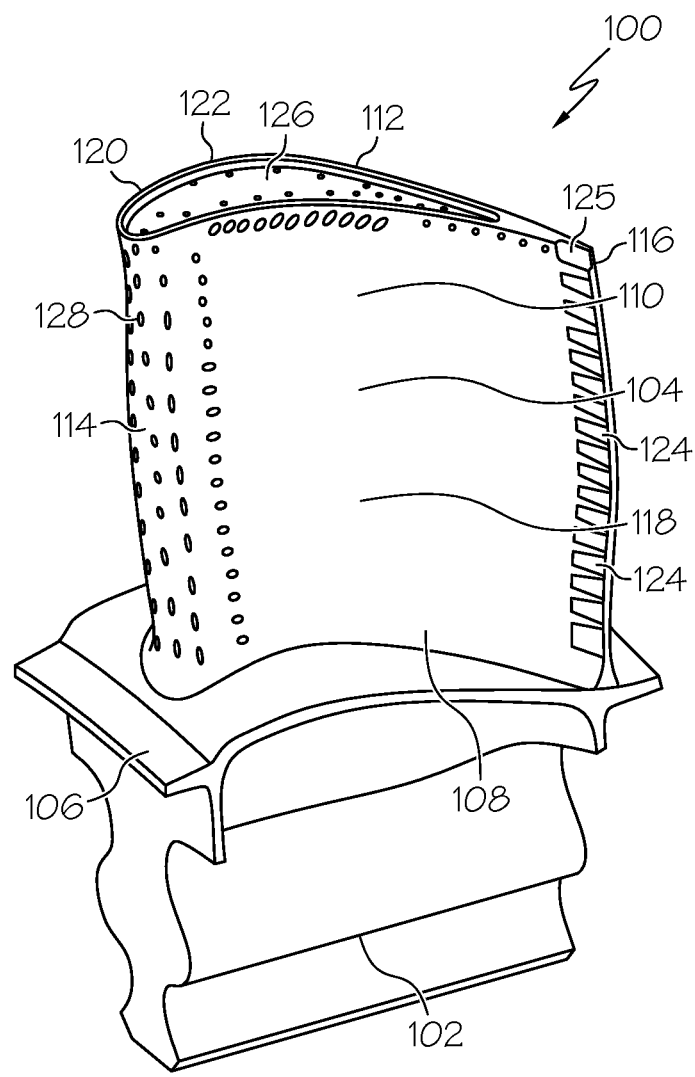
FIG. 1 is an exemplary gas turbine engine component, particularly a turbine blade, which may serve as the metallic article of the present disclosure, in some embodiments.

FIG. 1 illustrates an exemplary gas turbine engine blade configuration 100 that may be suitable for use in connection with the methods described herein, in one embodiment. The blade 100 includes a blade attachment section 102, an airfoil 104, and a platform 106. The blade attachment section 102 provides an area in which a shape is machined. In an embodiment, the shape corresponds with a shape formed in a respective blade attachment slot (not shown) of the turbine hub. For example, in some embodiments, the shape may be what is commonly referred to in the art as a "firtree" shape. In other embodiments, the shape may be a beveled shape. However, in other embodiments, any one of numerous other shapes suitable for attaching the blade 100 to the turbine may be alternatively machined therein.

The airfoil 104 has a root 108 and two outer walls 110, 112. The root 108 is attached to the platform 106 and each outer wall 110, 112 has outer surfaces that define an airfoil shape. The airfoil shape includes a leading edge 114, a trailing edge 116, a pressure side 118 along the first outer wall 110, a suction side 120 along the second outer wall 112, a tip outer wall 122, a plurality of pressure side discharge trailing edge slots 124 (the edge slot at the tip is the tip trailing edge slot 125), a tip plenum 126 recessed radially inward from the tip outer wall 122, and a series of film cooling holes 128. Holes 128 may be provided along the leading edge 114, along the first outer wall 110 near the tip outer wall 122, and/or along the tip plenum 126. Though not shown in FIG. 1, the blade 100 may have an internal cooling circuit formed therein, which may extend from an opening in the platform 106 through the blade 100 and may include various passages that eventually communicate with the plurality of trailing edge slots 124 and the tip trailing edge slot 125, or other openings (not shown) that may be formed in the blade 100. In particular, the convex suction side wall 112, the concave pressure side wall 110, and the tip 122 each include interior surfaces defining the internal cooling circuit.

Figure 2:
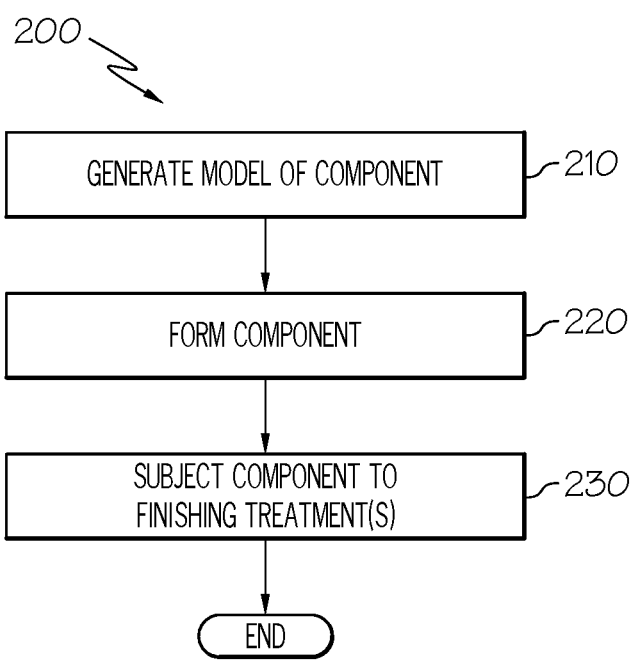
FIG. 2 is a flow diagram illustrating steps in a method of forming a metallic article using additive manufacturing techniques in accordance with some embodiments the present disclosure.

The gas turbine engine blade 100 of FIG. 1, or any other metallic article (for use in a gas turbine engine or otherwise), may be manufactured initially in accordance with the additive manufacturing techniques described in connection with FIGS. 2 and 3. FIG. 2 is a flowchart illustrating a method 200 for manufacturing an article/component, for example the gas turbine engine blade 100, using additive manufacturing techniques based on low energy density energy beams. In a first step 210, a model, such as a design model, of the component may be defined in any suitable manner. For example, the model may be designed with computer aided design (CAD) software and may include three-dimensional ("3D") numeric coordinates of the entire configuration of the component including both external and internal surfaces. In one exemplary embodiment, the model may include a number of successive two-dimensional ("2D") cross-sectional slices that together form the 3D component. Of course, it is not necessary that a "near-net" component be formed using this process. Rather, it may simply be desired to produce a "block" of the alloy using additive manufacturing. Accordingly, the present disclosure should not be considered as limited by any particular article/component design.

In step 220 of the method 200, the component is formed according to the model of step 210. In one exemplary embodiment, a portion of the component is formed using a rapid prototyping or additive layer manufacturing process. In other embodiments, the entire component is formed using a rapid prototyping or additive layer manufacturing process. Although additive layer manufacturing processes are described in greater detail below, in still other alternative embodiments, portions of the component may be forged or cast in step 220.

Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the article/component in step 220, such as blade 100. DMLF is a commercially available laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 220 is performed with DMLF techniques to form the component. However, prior to a discussion of the subsequent method steps, reference is made to FIG. 3, which is a schematic view of a DMLF system 300 for manufacturing the component, for example one or more gas turbine engine components, in accordance with an exemplary embodiment.

Figure 3:
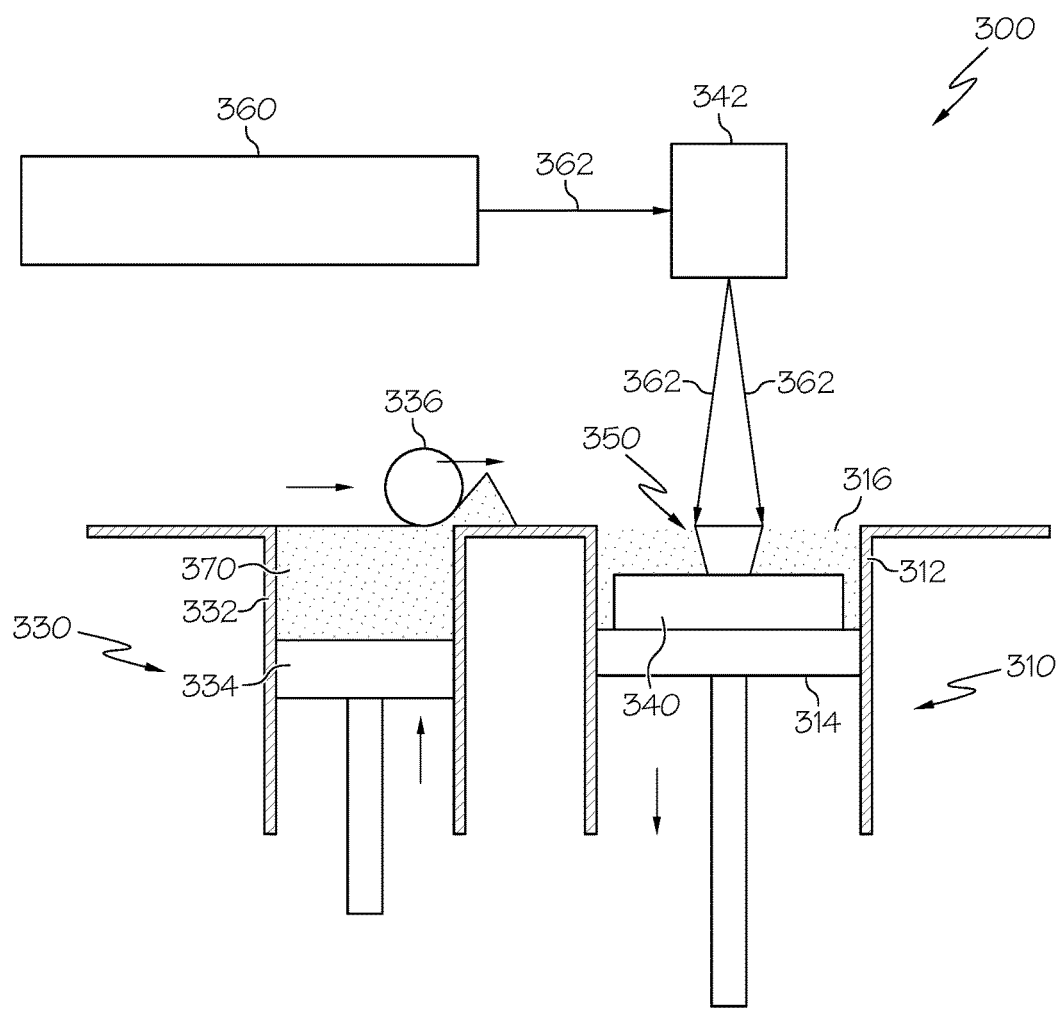
FIG. 3 is an exemplary additive manufacturing system suitable for use in forming a metallic article in accordance with some embodiments of the present disclosure.

Referring to FIG. 3, the system 300 includes a fabrication device 310, a powder delivery device 330, a scanner 342, and a low energy density energy beam generator, such as a laser 360 (or an electron beam generator) that functions to manufacture the article 350 (e.g., the component) with build material 370. The fabrication device 310 includes a build container 312 with a fabrication support 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310.

During operation, a build plate 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 342 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

One aspect of the present disclosure is that the article 350 is fabricated with the build direction as the vertical/longitudinal direction for the direction of desired elongated grains. Referring back to FIG. 1, for example, the blade 100 would thus be additively-manufactured starting from the bottom of the attachment section 102, proceeding, layer-by-layer, up to the platform 106, and thereafter proceeding to the airfoil 104, and finishing with the tip outer wall 122. For other articles that are not blades, the person having ordinary skill in the art will be well-aware of the desired direction of elongated grains (which may be dependent on the intended use of the article), and will utilize an appropriately-oriented CAD schematic to achieve the layer-by-layer additive manufacturing of the desired article accordingly.

In some embodiments, optionally, a directionally solidified or single crystal seed starter may be fastened to the build plate 340 to promote directionally solidified grains in the desired vertical/longitudinal direction. In an embodiment, a seed crystal is provided having at least a predetermined primary orientation. For example, seed crystals employed for producing a directionally solidified and single crystal microstructures may have at least the predetermined primary orientation. Scanning the pattern to melt the deposited powder allows the deposited metal powder to acquire the crystallographic orientation of the seed crystal. Accordingly, the initial layer comprises a plurality of grains that are arranged in crystal structures having the predetermined primary orientation. The desired primary orientation is obtained by positioning the seed crystal in the predetermined primary orientation. In an embodiment, the predetermined primary orientation is <001>. Because the initial layer has substantially the same crystallographic microstructure as the seed crystal, for these applications the successive layer comprises a plurality of grains that are arranged in crystal structures having at least the predetermined primary orientation. Further information regarding the use of seed crystals may be found in commonly-assigned U.S. Pat. No. 8,728,388, the contents of which are herein incorporated by reference in their entirety. In some optional embodiments, the build plate 340 may be heated during the build process in order to support continued growth in the primary orientation.

Upon completion of a respective layer, the fabrication support 314 is lowered and the delivery support 334 is raised. Typically, the fabrication support 314, and thus the article 350, does not move in a horizontal plane during this step. The roller or wiper 336 again pushes a portion of the build material 370 from the delivery device 330 to form an additional layer of build material 370 on the working plane 316 of the fabrication device 310. The laser beam 362 is movably supported relative to the article 350 and is again controlled to selectively form another cross-sectional layer. As such, the article 350 is positioned in a bed of build material 370 as the successive layers are formed such that the unfused and fused material supports subsequent layers. This process is continued according to the modeled design as successive cross-sectional layers are formed into the completed desired portion, e.g., the component of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

Any suitable laser and laser parameters may be used, including considerations with respect to power, laser beam spot size, and scanning velocity. The build material 370 may be provided as a metallic superalloy. For use in gas turbine engines, nickel-based superalloys are commonly used. One example of a suitable nickel-based superalloy for use with the methods of the present disclosure is the alloy Mar-M-247, the elemental constituents of which are well-known in the art.

Returning to FIG. 2, at the completion of step 220, the article/component may be given a stress relief treatment and then is removed from the additive manufacturing system (e.g., from the DMLF system 300). In optional step 230, the component formed in step 220 may undergo finishing treatments. Finishing treatments may include, for example, polishing and/or the application of coatings. If necessary, the component may be machined to final specifications. For example, in some embodiments in accordance with the present disclosure, gas turbine engine components can be manufactured by the DMLF process (optionally including machining) described herein.

Figure 4:
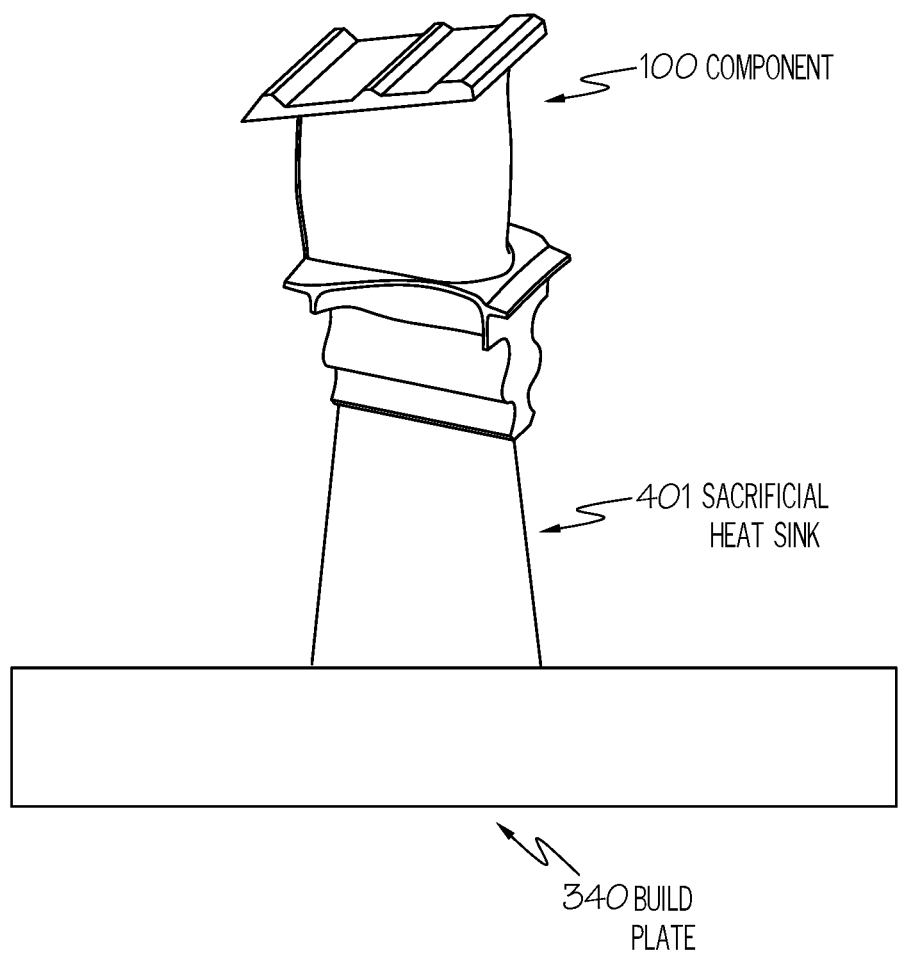
FIG. 4 illustrates the inclusion of a sacrificial heat sink on an article in accordance with some embodiments of the present disclosure.

In some embodiments of the present disclosure, optionally, a sacrificial gradient heat sink portion 401 is fabricated outside the article, e.g., blade 100, and metallurgically coupled with the article 100, starting from the build plate 340, as shown in FIG. 4. The sacrificial gradient heat sink may be provided to ensure a thermal gradient is present in the component during subsequent heat treatment, as will be described in greater detail below. In some embodiments, the sacrificial gradient heat sink portion may be fabricated on the opposite side of the component 100 away from the build plate 340. The sacrificial gradient heat sink portion 401 may be provided to extract heat out of the component during subsequent heat treatment, thus maintaining the thermal gradient necessary to directionally recrystallize the microstructure in the preferential (longitudinal) direction.

Unlike prior art methods producing nickel based superalloy parts, the present disclosure utilizes an innovative gradient anneal heat treatment to produce a directionally recrystallized microstructure in additively-manufactured articles to give an added directional force for secondary recrystallization in a preferred direction. Un-treated additively-manufactured articles consist of epitaxially-grown fine grains at each section, generally perpendicular to the build direction. In this disclosure, an added thermal force is applied for further grain growth to occur in the build direction. As such, the present disclosure utilizes the elongated grain growth from the additive manufacturing process to obtain a directionally recrystallized microstructure for improved mechanical properties such as creep or stress rupture strength. Combining an additively-manufactured elongated grain microstructure in conjunction with an innovative gradient heat treatment method produces a directionally recrystallized microstructure that provides superior mechanical properties over using additively-manufactured parts without a gradient heat treatment.

Figure 5:
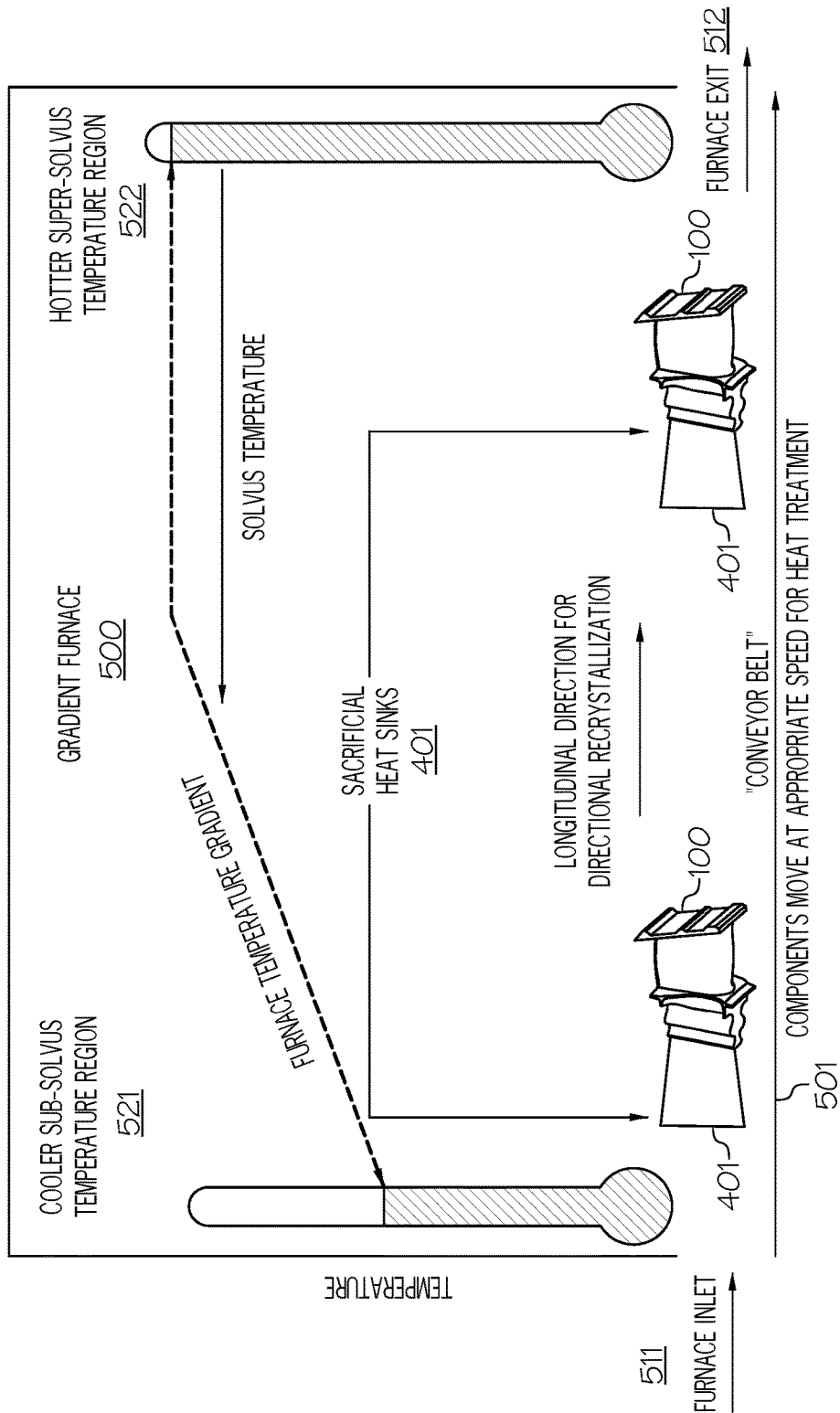
FIG. 5 illustrates an exemplary gradient furnace, and the processing of an article in the exemplary gradient furnace, in accordance with some embodiments of the present disclosure.

Referring now to FIG. 5, the article (e.g., blade 100) (including sacrificial heat sink 401 if provided) are processed in a gradient furnace 500, where the thermal gradient in the article during the heat treatment is aligned with the desired elongated grain orientation for the article. The gradient furnace generally includes a furnace inlet 511 and a furnace outlet 512, and a conveyor belt 501 that between the inlet 511 and the outlet 512. Regions of the interior of furnace 500 nearer the furnace inlet 511 may be referred to as a cooler temperature region 521, whereas regions of the interior of furnace 500 nearer the furnace outlet 512 may be referred to as a hotter temperature region 522. The cooler temperature region 521 operates at a temperature below the gamma prime solvus temperature of the metal material (e.g., nickel-based superalloy) that forms the article, whereas the hotter temperature region 522 operates at a temperature above the gamma prime solvus temperature of the metal material. A temperature gradient exists between the regions 521 and 522, as illustrated in FIG. 5.

The component is processed through the gradient furnace 500 such that the sacrificial heat sink 401 (if provided) is the last portion of the component to be heated by the furnace 500. The sacrificial heat sink 401 (while still in the furnace cool zone) draws heat from the article which is in the hotter zones of the furnace (522), thus providing a temperature gradient in the additively-manufactured article, which then results in a directionally recrystallized microstructure. The article is processed through the gradient furnace 500 with the temperature of the article continuing to ramp until it is above its gamma prime solvus temperature. In some embodiments, as illustrated, the article temperature ramps up past the gamma prime solvus temperature while the sacrificial heat sink 401 (if provided) is still in the lower temperature sub-solvus temperature zone of the furnace 500.

The article is processed at a translational rate through the furnace 500 until the entire article traverses through the high temperature super-solvus temperature zone 522 to achieve directionally recrystallized grain growth in the longitudinal (oven-traverse) direction. In some embodiments, the step of conveying the metallic article through the gradient furnace 500 is performed at a conveyance rate of about 1 to about 2 inches per hour, such as about 1.5 inches per hour. However, the actual rate employed is dependent on the size, shape, and configuration of the article, as well as the material employed, and may require as small amount of experimentation by the operator to determine an optimal rate for the article at issue.

Upon exiting the gradient furnace 500, the article has a directionally-recrystallized microstructure, as alluded to above. Subsequent to exiting the gradient furnace 500, further processing steps may optionally be employed. These further processing steps include, for example, quenching in a non-oil quenching medium, removing the sacrificial heat sink portion 401 from the article, ageing to optimize the mechanical properties of the article, inspections to confirm acceptable metallography, machining to the final, desired shape of the article, and encapsulation, such as encapsulation according to the process disclosed in commonly-assigned U.S. Patent Application Publication 2011/0311389, the contents of which are herein incorporated by reference in their entirety.

Accordingly, the present disclosure has provided methods for directionally-recrystallizing metallic articles, such as gas turbine engine blades and vanes, which are manufactured using additive manufacturing techniques, such as direct metal laser sintering or electron beam melting. Although the present disclosure is provided in the context of gas turbine engine development and testing, it should be appreciated that the methods described herein may be used for the manufacturing of any metallic article to be used for any application. The disclosed methods produced directionally-recrystallized metallic articles that exhibit metallic properties that are the same as or similar to traditionally-cast directionally-solidified articles. Beneficially, the disclosed methods allow for the rapid design and production of such components to reduce cycle time in the development and testing of critical path components.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for manufacturing a metallic article comprising the steps of:
   providing or obtaining a metallic material in powder form;
   using an additive manufacturing process, building the metallic article from the powder-form metallic material, layer-by-layer, in a build direction, wherein as a result of the additive manufacturing process, the metallic article comprises columnar grain structures oriented in the build direction;
   building a sacrificial piece onto the metallic article using the additive manufacturing process, the sacrificial piece being metallurgically coupled to the metallic article and comprising the metallic material; and
   conveying the metallic article through a gradient furnace in a direction of conveyance from a first area of the gradient furnace to a second area of the gradient furnace to increase a size of the columnar grain structures in the metallic article, wherein the metallic article is conveyed through the gradient furnace in an orientation such that the columnar structures oriented in the build direction are substantially parallel to the direction of conveyance, wherein the first area of the gradient furnace heats the metallic article to a temperature that is below a solvus temperature of the metallic material and the second area of the gradient furnace heats the metallic article to a temperature that is above the solvus temperature of the metallic material, the temperature of the gradient furnace increasing in a gradated manner from the first area to the second area, and wherein the metallic article is oriented with respect to the gradient furnace such that the sacrificial piece enters the gradient furnace subsequent to the metallic article onto which the sacrificial piece is built.

2. The method of claim 1, wherein the additive manufacturing processes is either electron beam melting (EBM) or direct metal laser fusion (DMLF).

3. The method of claim 1, further comprising removing the sacrificial piece from the metallic article subsequent to the step of conveying the metallic article through the gradient furnace.

4. The method of claim 1, wherein the additive manufacturing process employs a heated build plate to maintain the metallic article at an elevated temperature as it is built, layer-by-layer, in the build direction.

5. The method of claim 1, wherein the additive manufacturing process employs a directionally-crystallized metallic seed layer and builds the metallic article, layer-by-layer, from the seed layer, thereby resulting in an improved columnar grain structure, oriented in the build direction, of the metallic article.

6. The method of claim 1, wherein the metallic material comprises a Ni-based superalloy.

7. The method of claim 1, wherein the metallic article comprises a gas turbine engine component, such as a turbine blade, vane, or nozzle.

8. The method of claim 1, further comprising, subsequent to conveying the metallic article through the gradient furnace, quenching the metallic article in a non-oil quenching medium.

9. The method of claim 8, further comprising, subsequent to quenching the metallic article, performing one or more of hot-isostatic pressing, ageing, and machining of the metallic article.

10. The method of claim 1, wherein the step of conveying the metallic article through the gradient furnace is performed at a conveyance rate of about 1 to about 2 inches per hour.

* * * * *